UNITED STATES PATENT OFFICE.

THOMAS J. GLINES, OF HEBRON, NEW YORK.

IMPROVED MEDICINE FOR THE CURE OF DIPHTHERIA, &c.

Specification forming part of Letters Patent No. 44,299, dated September 20, 1864; antedated September 10, 1864.

*To all whom it may concern:*

Be it known that I, THOMAS J. GLINES, of Hebron, in the county of Washington, State of New York, have invented or discovered a new and useful Compound or Remedy for the Treatment of Diphtheria and other Diseases; and I do hereby declare that the following is a full and exact description thereof.

The nature of my invention is the combination of the peculiar medicinal powers of serpentaria with those of chlorate of potash and muriatic acid, as hereinafter specified.

I will proceed to describe its preparation.

I take of chlorate of potash one hundred and thirty grains, finely powdered, put it into a dry glass vessel of sufficient size, add one fluid dram of pure muriatic acid, stir briskly for a few seconds, when white fumes begin to rise, when quickly pour upon it eight fluid ounces of infusion of serpentaria of the strength of half an ounce of the root to one pint of boiling water. The infusion must be cold when added to the salt and acid.

What I claim as my invention or discovery, and wish to secure by Letters Patent, is—

The combination of the medicinal powers of serpentaria in the treatment of disease, in the manner herein described, with muriatic acid and chlorate of potash.

T. J. GLINES.

Witnesses:
   J. B. CLEMENTS,
   DUANE CLEMENT.